United States Patent
Havel et al.

(10) Patent No.: US 11,802,261 B2
(45) Date of Patent: Oct. 31, 2023

(54) SYSTEM AND METHOD FOR PRODUCING BEER/HARD CIDER CONCENTRATE

(71) Applicant: Porifera, Inc., San Leandro, CA (US)

(72) Inventors: Frederik Havel, Beaconsfield (CA); David Durkee, Lakewood, CO (US)

(73) Assignee: Porifera, Inc., San Leandro, CA (US)

(*) Notice: Subject to any disclaimer, the term of this patent is extended or adjusted under 35 U.S.C. 154(b) by 600 days.

(21) Appl. No.: 16/607,460

(22) PCT Filed: Apr. 24, 2018

(86) PCT No.: PCT/US2018/029162
§ 371 (c)(1),
(2) Date: Oct. 23, 2019

(87) PCT Pub. No.: WO2018/200538
PCT Pub. Date: Nov. 1, 2018

(65) Prior Publication Data
US 2020/0140797 A1    May 7, 2020

Related U.S. Application Data

(60) Provisional application No. 62/489,229, filed on Apr. 24, 2017.

(51) Int. Cl.
| | | |
|---|---|---|
| C12H 3/04 | (2019.01) | |
| C12H 1/07 | (2006.01) | |
| C12C 11/11 | (2019.01) | |
| C12H 3/02 | (2019.01) | |
| C12H 6/00 | (2019.01) | |

(52) U.S. Cl.
CPC ............. *C12H 1/063* (2013.01); *C12C 11/11* (2013.01); *C12H 3/02* (2019.02); *C12H 3/04* (2019.02); *C12H 6/00* (2019.02)

(58) Field of Classification Search
CPC ... C12H 3/02; C12H 3/04; C12H 6/00; C12H 1/063; C12C 11/11
See application file for complete search history.

(56) References Cited

U.S. PATENT DOCUMENTS
| | | |
|---|---|---|
| 2,433,411 A | 12/1947 | Wallerstein |
| 3,323,920 A | 6/1967 | Malick |
| (Continued) | | |

FOREIGN PATENT DOCUMENTS
| | | |
|---|---|---|
| EP | 3026104 | 6/2016 |
| EP | 3101114 | 12/2016 |
| (Continued) | | |

OTHER PUBLICATIONS
U.S. Appl. No. 17/637,699, filed Feb. 23, 2022, Havel et al.
(Continued)

*Primary Examiner* — Vera Stulii
(74) *Attorney, Agent, or Firm* — Dorsey & Whitney LLP

(57) ABSTRACT

A system and method are provided to produce a beverage concentrate such as a beer extract. A forward osmosis (FO) filtration technique removes pure water from a conventional brewed beer; accordingly, the beer extract can be produced without distillation or other alteration steps that may negatively impact of flavor and aroma components of the beer. A draw solution is used to provide a differential osmotic pressure through a FO filtration device. The diluted draw solution is recycled by reverse osmosis, distillation, and combinations thereof.

13 Claims, 5 Drawing Sheets

(56) References Cited

U.S. PATENT DOCUMENTS

| | | | |
|---|---|---|---|
| 4,792,402 | A | 12/1988 | Fricker |
| 4,957,749 | A | 9/1990 | Prieels et al. |
| 5,869,174 | A | 2/1999 | Wang |
| 8,920,654 | B2 | 12/2014 | Revanur et al. |
| 9,206,060 | B1 | 12/2015 | Abusharkh |
| 9,216,391 | B2 | 12/2015 | Revanur et al. |
| 2004/0026338 | A1 | 2/2004 | Biebuyck et al. |
| 2007/0031954 | A1 | 2/2007 | Mairal et al. |
| 2007/0173670 | A1 | 7/2007 | Rix et al. |
| 2010/0009031 | A1 | 1/2010 | Nguyen et al. |
| 2010/0047386 | A1 | 2/2010 | Tatera |
| 2010/0224561 | A1 | 9/2010 | Marcin |
| 2014/0224716 | A1 | 8/2014 | Hancock |
| 2014/0377429 | A1 | 12/2014 | Pellaud et al. |
| 2016/0016115 | A1 | 1/2016 | Wilson et al. |
| 2016/0136579 | A1 | 5/2016 | McGovern et al. |
| 2016/0230133 | A1 | 8/2016 | Peterson et al. |
| 2017/0049918 | A1 | 2/2017 | Wang et al. |
| 2017/0114312 | A1 | 4/2017 | Tatera |
| 2017/0210656 | A1 | 7/2017 | Hancock et al. |
| 2017/0260487 | A1 | 9/2017 | De Schutter et al. |

FOREIGN PATENT DOCUMENTS

| | | |
|---|---|---|
| EP | 3252136 | 12/2017 |
| EP | 3330361 | 6/2018 |
| JP | S61-271959 | 12/1986 |
| JP | H07-060005 | 6/1995 |
| JP | 2000-014378 | 1/2000 |
| JP | 2011-514140 | 5/2011 |
| JP | 2013-150954 | 8/2013 |
| JP | 2014-097444 | 5/2014 |
| JP | 2016-041412 | 3/2016 |
| JP | 2016-514039 | 5/2016 |
| JP | 2017-006843 | 1/2017 |
| KR | 10-2016-0121666 | 10/2016 |
| KR | 10-2017-0098838 | 8/2017 |
| WO | WO 84/03102 | 8/1984 |
| WO | WO 2016/160810 | 10/2016 |
| WO | WO 2016/207079 | 12/2016 |
| WO | WO 2016/210337 | 12/2016 |
| WO | WO 2018/100052 | 6/2018 |
| WO | WO 2018/200538 | 11/2018 |
| WO | WO 2019/113335 | 6/2019 |

OTHER PUBLICATIONS

Official Action for Great Britain Patent Application No. GB1916496. 1, dated Oct. 18, 2021, 2 pages.
Official Action for Korea Patent Application No. 2019-7034586, dated Nov. 24, 2021, 3 pages.
Official Action for Canada Patent Application No. 3084619, dated Feb. 4, 2022, 3 pages.
Official Action for Great Britain Patent Application No. 2008545.2, dated Jan. 22, 2022, 6 pages.
Notice of Allowance for Japan Patent Application No. 2020-531071, dated Jul. 7, 2021, 3 pages.
Official Action for Korea Patent Application No. 2020-7019412, dated Feb. 23, 2022, 16 pages.
International Preliminary Report on Patentability for International (PCT) Patent Application No. PCT/US2020/047305, dated Mar. 10, 2022, 7 pages.
Official Action for U.S. Appl. No. 16/769,338, dated Apr. 22, 2022, 8 pages. Restriction Requirement.
Notice of Allowance for Canada Patent Application No. 3061006, dated Jul. 6, 2021, 1 page.
Official Action (with English translation) for Korea Patent Application No. 2019-7034586, dated May 25, 2021, 20 pages.
Notice of Allowance for Australia Patent Application No. 2018378697, dated Jun. 22, 2021, 4 pages.
Official Action for Canada Patent Application No. 3084619, dated Jun. 30, 2021, 3 pages.
Official Action (with English translation) for Japan Patent Application No. 2020-531071, dated Jul. 7, 2021, 8 pages.
Extended European Search Report for European Patent Application No. 18886863.2, dated Sep. 28, 2021, 15 pages.
Official Action for Canada Patent Application No. 3084619, dated Nov. 2, 2022, 4 pages.
Official Action for Great Britain Patent Application No. 2008545.2, dated Oct. 3, 2022, 3 pages.
Intention to Grant Great Britain Patent Application No. 2008545.2, dated Nov. 8, 2022, 2 pages.
Official Action for Canada Patent Application No. 3148679, dated Dec. 2, 2022, 3 pages.
Official Action (no English translation available) for Panama Patent Application No. 93853-01, dated Oct. 24, 2022, 4 pages.
Official Action for U.S. Appl. No. 16/769,338, dated Nov. 28, 2022, 10 pages.
Official Action for Brazil Patent Application No. 11-2019-022203-0, dated Jun. 28, 2022, 36 pages.
Official Action for Great Britain Patent Application No. 2008545.2, dated Jun. 23, 2022, 4 pages.
Notice of Allowance for Korea Patent Application No. 2020-7019412, dated Aug. 26, 2022, 4 pages.
Official Action for U.S. Appl. No. 16/769,338, dated Jul. 12, 2022, 13 pages.
Notice of Allowance for Australian Patent Application No. 2018257905, dated Jul. 10, 2020, 4 pages.
"Office Action for DO Appl. No. P2019/0271, dated Sep. 30, 2021".
"International Search Report and Written Opinion for PCT/US2018/029162, dated Jul. 9, 2018".
"Office Action and Translation for JP 2019-557783, dated Nov. 4, 2021".
"Preliminary Office Action for BR112019022203-0, dated Jun. 22, 2022".
Extended European Search Report for European Patent Application No. 18791031.0, dated Nov. 26, 2020, 8 pages.
Official Action (with English translation) for Japanese Patent Application No. 2019-557783, dated Nov. 4, 2020, 6 pages.
U.S. Appl. No. 16/769,338, filed Jun. 3, 2020, Durkee et al.
"Membrane filter Search Results," Millipore Sigma, Archived web page dated Dec. 14, 2018, retrieved from https://web.archive.org/web.20181214102040/https://www.emdMillipore.com/US/en/search/membrane+filter?SearchTerm=membrane+filter, 1 page.
International Search Report and Written Opinion for International (PCT) Patent Application No. PCT/US20/27731, dated Jun. 15, 2020, 17 pages.
International Preliminary Report on Patentability for International (PCT) Application No. PCT/US18/64281, dated Jun. 18, 2020, 7 pages.
International Preliminary Report on Patentability for International (PCT) Application No. PCT/US18/29162, dated Nov. 7, 2019, 9 pages.
Official Action for Australian Patent Application No. 2018257905, dated Mar. 6, 2020, 4 pages.
Official Action (no English translation available) for Panamanian Patent Application No. 92847-01, dated Feb, 13, 2020, 4 pages.
International Search Report and Written Opinion for International (PCT) Patent Application No. PCT/US18/64281, dated Feb. 6, 2019 12 pages.
Official Action for Canadian Patent Application No. 3061006, dated Jan. 25, 2021, 3 pages.
International Search Report and Written Opinion for International (PCT) Patent Application No. PCT/US2020/047305, dated Nov. 23, 2020, 14 pages.
International Search Report and Written Opinion for International (PCT) Patent Application No. PCT/EP2018/029162, dated Apr. 24, 2018.
Official Action (no English translation available) for Dominican Republic Patent Application No. P2019-0271, dated May 25, 2021, 6 pages.
Official Action (with English translation) for India Patent Application No. 201917045552, dated May 24, 2021, 5 pages.
Notice of Allowance (no English translation available) for Japanese Patent Application No. 2019-557783, dated Mar. 16, 2021, 3 pages.

(56) References Cited

OTHER PUBLICATIONS

Official Action for Australia Patent Application No. 2018378697, dated Mar. 25, 2021, 5 pages.
"Office Action and Translation for BR Appl. No. BR112019022203-0, dated Jul. 4, 2023 pp. all".

SYSTEM AND METHOD FOR PRODUCING BEER/HARD CIDER CONCENTRATE

CROSS REFERENCE TO RELATED APPLICATION

This application is a national stage application under 35 U.S.C. 371 and claims the benefit of PCT Application No. PCT/US2018/029162 having an international filing date of 24 Apr. 2018, which designated the United States, which PCT application claimed the benefit of and priority, under 35 U.S.C. § 119(e), to U.S. Provisional Application Ser. No. 62/489,229, filed Apr. 24, 2017, entitled "System and Method for Producing Beer/Hard Cider Concentrate," the entire disclosures of each of which are hereby incorporated herein by reference, in their entireties, for all that they teach and for all purposes.

FIELD

The invention relates to processing of alcoholic beverages to reduce water content therein, and more particularly, to a system and method for producing a brewed malt/hard cider beverage concentrate including forward osmosis processing in which water is removed from the beverage.

BACKGROUND

For malt beverages including beer, lager, and others, and for hard cider the major component is water. Because of the cost associated with storing and transporting beverages, some technology has developed to reduce the water content in such beverages so that the storage and transportation costs can be reduced. Basic methods for reducing the water content include those that filter the water from a finished brewed beer product or remove the water by evaporation. The resultant product can then be delivered to a retail establishment in a concentrated form in which the beverage is significantly lighter and reduced in volume. Water and carbonation are then added to reconstitute the beverage prior to consumer consumption.

For other beverages, such as soft drinks, it is well-known to provide a syrup mixture or solution that is prepared for consumption at a retail dispense location by adding water and carbonation. In general, soft drinks have much simpler flavor and aroma components as compared to malt beverages. Accordingly, there is no substantial reduction in the quality of a beverage made from a concentrate as compared to the fully hydrated and carbonated beverage prepared at a manufacturing facility.

Alcoholic malt beverages and hard ciders are considerably more complex than soft drinks. Previous attempts to dewater malt beverages have not been particularly successful because of substantial differences in the taste of reconstituted malt beverages as compared to those finished brewed products provided from a manufacturing facility/brewery.

One example of a reference that discloses a prior art attempt for concentrating an alcoholic beverage includes the U.S. Pat. No. 4,792,402. This reference discloses a method for concentrating an alcoholic beverage that comprises subjecting the beverage to reverse osmosis (RO) to create a beverage concentrate of lower water content. The membrane used in the RO process allows passage of water but is at least partially permeable to alcohol and volatile flavor components of the beverage. The membrane is impermeable to dissolved solids, subjecting the permeate from the reverse osmosis to a subsequent distillation step to separate alcohol and volatile flavor components of the beverage that pass through the membrane. The recovered alcohol and volatile flavor components are added back to the beverage concentrate. According to this reference, the relatively low molecular weight flavor components that pass through and into the permeate are comparatively stable to distillation temperatures as compared with other components of the beverage; therefore, distillation of the permeate does not significantly affect the aromatic and flavor components of the beverage when hydrated.

Another reference that discloses a method for concentrating an alcoholic beverage is the U.S. Pat. No. 3,323,920. This invention includes a method for concentrating the beverage by crystallization and distillation. More specifically, the method includes cooling an admixture comprising a multi-component aqueous liquid resolvable by crystallization and containing a component more volatile than water whereby at least a portion of the water freezes to form a slurry of ice crystals in a mother liquor. The mother liquor is separated from the ice crystals. The mother liquor is distilled to remove at least a portion of the volatile components overhead and then recovering the bottoms.

Another reference that discloses an alcoholic beverage concentrate includes the published Intl. App. No WO 84/03102. According to this invention, a method for concentrating alcoholic beverages includes subjecting the beverage to reverse osmosis to form a beverage concentrate. Water is allowed to pass through the RO membrane and may allow passage of some alcohol and volatile flavor components but is impermeable to dissolved solids. The permeate from the reverse osmosis is then subjected to distillation to separate the alcohol and flavor compound components. The recovered alcohol and volatile components from the distillation step are then recombined with the beverage concentrate from the reverse osmosis.

Another reference that discloses a method for preparing a beer concentrate is the European Patent App. No. EP 3101114 A1. This reference discloses a two-step concentration method wherein the first step involves a high-efficiency nanofiltration producing a highly concentrated retentate and an aqueous permeate fraction comprising alcohol and volatile flavor components. The second step includes removing water from the permeate fraction to obtain a highly-concentrated alcohol solution also comprising volatile flavor components which is then combined with the retentate from the first step to produce a final beverage concentrate.

One significant problem associated with these and other prior art methods for concentrating beverages is that many flavor and aromatic components are still sacrificed; that is, many of these components are lost in the concentration process and cannot be recovered. Accordingly, when the beverages are rehydrated, some of the distinctive flavor and aromas of the original beverages are lost.

SUMMARY

According to the invention, a system and method are provided to produce a beverage concentrate. According to one aspect of the invention, it includes a method of producing a beverage concentrate for a malt beverage, beer, or brewed hard cider—referred to herein as a "beer extract." The beer extract is produced using a forward osmosis (FO) filtration technique that removes pure water from a conventional brewed beer or hard cider. The beer extract is produced without further steps such as distillation, reverse osmosis, or other processing steps. The retentate obtained from the FO filtration maintains nearly all characteristics of a regular beer. Accordingly, flavor and aromatic components which are lost in prior art methods utilizing reverse osmosis and distillation are more thoroughly retained in the present invention.

In accordance with one preferred embodiment, the method includes introducing a standard high gravity beer (e.g., a beer with 5-20% ABV), malt beverage, or brewed hard cider through a forward osmosis filtration device containing one or more sets or banks of FO filter membranes. As explained further below, one side of a filter membrane is contacted with the beer to be dewatered and the other side of the filter membrane is contacted with a draw solution that results in "pulling" the water out of the beer through the filter. The permeate water and draw solution define a diluted draw solution that is subsequently transferred to a holding tank for recycling in which the diluted draw solution is treated to remove the excess water content. The beer extract is ready for packaging in which no further processing steps are required. According to one specific embodiment, the beer extract reduces water content therein such that the extract has an ABV of approximately 24-33%.

The diluted draw solution must be returned to its original strength for reuse which may be achieved by passing the water and draw solution through a cascading set of reverse osmosis (RO) steps. In a first RO step, the retentate solution from the first RO step may be transported to another RO filtration, or distillation, step. The retentate solution from the second RO step may be transported to yet another RO filtration step, and this cascading or serial treatment of the draw solution is continued until the resultant solution has the desired water concentration. This resultant solution can then be used again in the FO filtration. The permeate stream from each RO step may be returned to a previous RO filtration step that has a similar water content so that there is a continual circulation of the draw solution until treated to a desired water concentration.

According to another aspect of the invention, in lieu of a malt beverage that has not been subjected to any pre-processing prior to entering the FO filtration, the beer can be pre-treated or preconditioned to better place the beverage in a condition to be concentrated. For example, it may be desired to remove dissolved oxygen in the malt beverage. This can be accomplished by use of packing lines with nitrogen gas in which the beer passes through the packing lines that are purged with the nitrogen gas to remove dissolved oxygen. One level of dissolved oxygen that may be advantageous is a beer which has less than 25 ppb dissolved oxygen. With respect to other gases in the beer such as carbon dioxide, the nitrogen purge could also be used to reduce dissolved carbon dioxide at a level below 1.0 gram of carbon dioxide per liter of beer.

According to yet another aspect of the invention, it has been found that it may be desirable to maintain the feed stream of the malt beverage or hard cider in a desired temperature range which may optimally allow the beverage to be filtered in the FO filtration. For example, temperature of the beer can be maintained in a range between about −1° C. and 20° C.

According to yet another aspect of the invention, it may be desirable to provide physical stabilization of the malt beverage or hard cider feed stream, referred to as "chill proofing". For example, physical stabilization can be obtained by selective addition of any one or selected combinations of tannic acid, SiOH, PVPP treatment, Proteolytic enzyme, pectinase enzyme and/or cold treatment at a temperature of −7° C. to −1° C. for a period of time up to about 72 hours.

With respect to formulation of the draw solution, one formula may generally include a combination of ethanol and glycerol, along with a remaining balance of water. Concentrations for the ethanol and glycerol may vary, but one workable formula for the present invention may include 28% to 38% ABV ethanol, 6% to 12% glycerol, and the remaining balance of water. Generally, the ethanol prevents alcohol in the beer from leaving the beer during the FO filtration. The glycerol provides a raised osmotic pressure in the malt beverage stream to move the water out of the malt beverage.

One example of filter membranes for forward osmosis that may be used in the present invention is disclosed in the U.S. Pat. No. 8,920,654 entitled "Thin Film Composite Membranes for Osmosis, and Their Preparation Methods", assigned to Porifera, Inc., this reference being incorporated herein in its entirety. Another U.S. patent assigned to Porifera, Inc. that discloses a membrane construction that may be used in the FO filtration of the present invention is described in the U.S. Pat. No. 9,216,391 entitled "Membranes Having Aligned 1-D Nanoparticles in a Matrix Layer for Improved Fluid Separation", this reference also being incorporated herein in its entirety.

Additional features and advantages of the invention will become apparent from a review of the drawings taken in conjunction with a review of the detailed description.

These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the invention, brief description of the drawings, detailed description, abstract, and claims themselves.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The invention includes a system and method for producing a malt beverage concentrate including forward osmosis (FO) filtration to remove a fractional portion of water from the malt beverage or hard cider.

Figure 1:
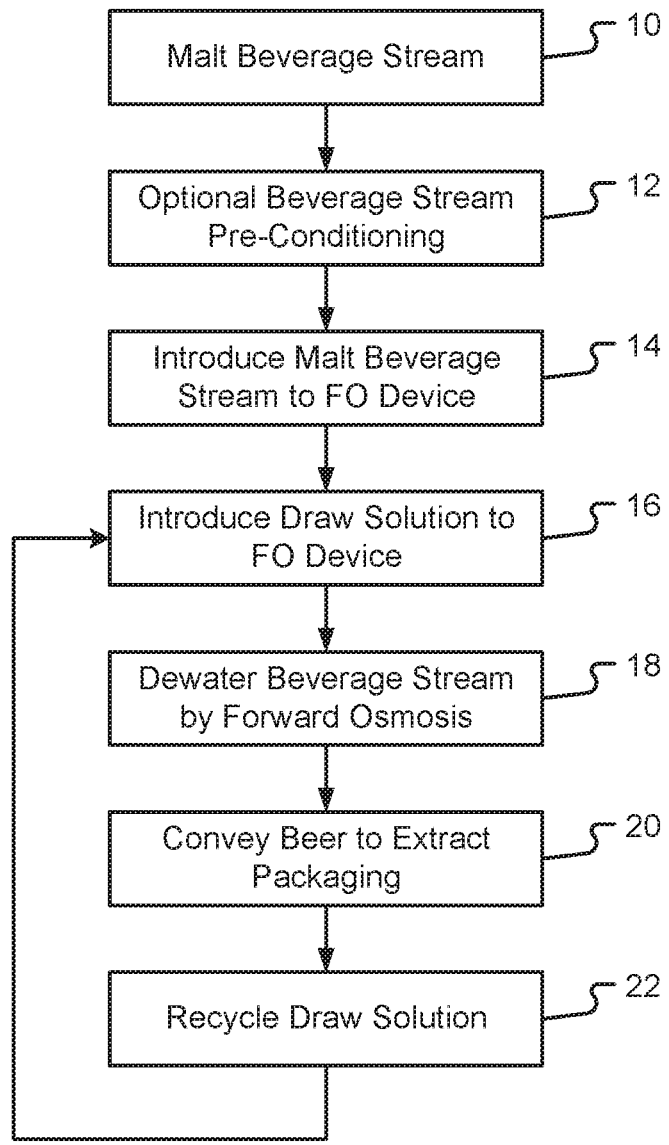
FIG. 1 is a simplified flow diagram illustrating a method of the invention.

Referring first to the simplified block diagram of FIG. 1, a feed stream of liquid 10 to be treated, such as a malt beverage, is provided. At step 12, optional preconditioning of the stream may take place. As mentioned, preconditioning may include removal of dissolved gases such as oxygen and carbon dioxide. In some embodiments, the stream may be heated or cooled as part of the preconditioning. At step 14, the malt beverage stream is introduced to FO filtration in which the malt beverage stream makes intimate contact with one side of a FO membrane. At step 16, a draw solution is introduced to the FO filtration device in which the draw solution makes intimate contact with an opposite side of the FO membrane. At step 18, dewatering of the beverage stream takes place in which differences in osmotic pressures across the membrane causes water to pass through the membrane from the beverage into the draw solution. At step 20, the resultant beer extract produced from the FO filtration is conveyed to a desired packaging configuration. At step 22, the draw solution is recycled so that it may be reintroduced to the FO filtration device for continuing dewatering of the malt beverage stream. As discussed in further detail, the recycling of the draw solution may be achieved in a number of ways to include reverse osmosis, distillation, and combinations thereof.

According to the method of the invention, the ethanol and glycerol in the draw solution serve to raise the osmotic pressure of water in the malt beverage to be higher than that of the osmotic pressure in the draw solution. Accordingly, this differential in osmotic pressures induces the flow of water across the membrane into the draw solution. Additionally, the presence of ethanol in the draw solution prevents ethanol from leaving the beverage. Other selected constituents may be added to the draw solution in order to either induce or prevent selected components from passing through the FO membrane.

Figure 2:
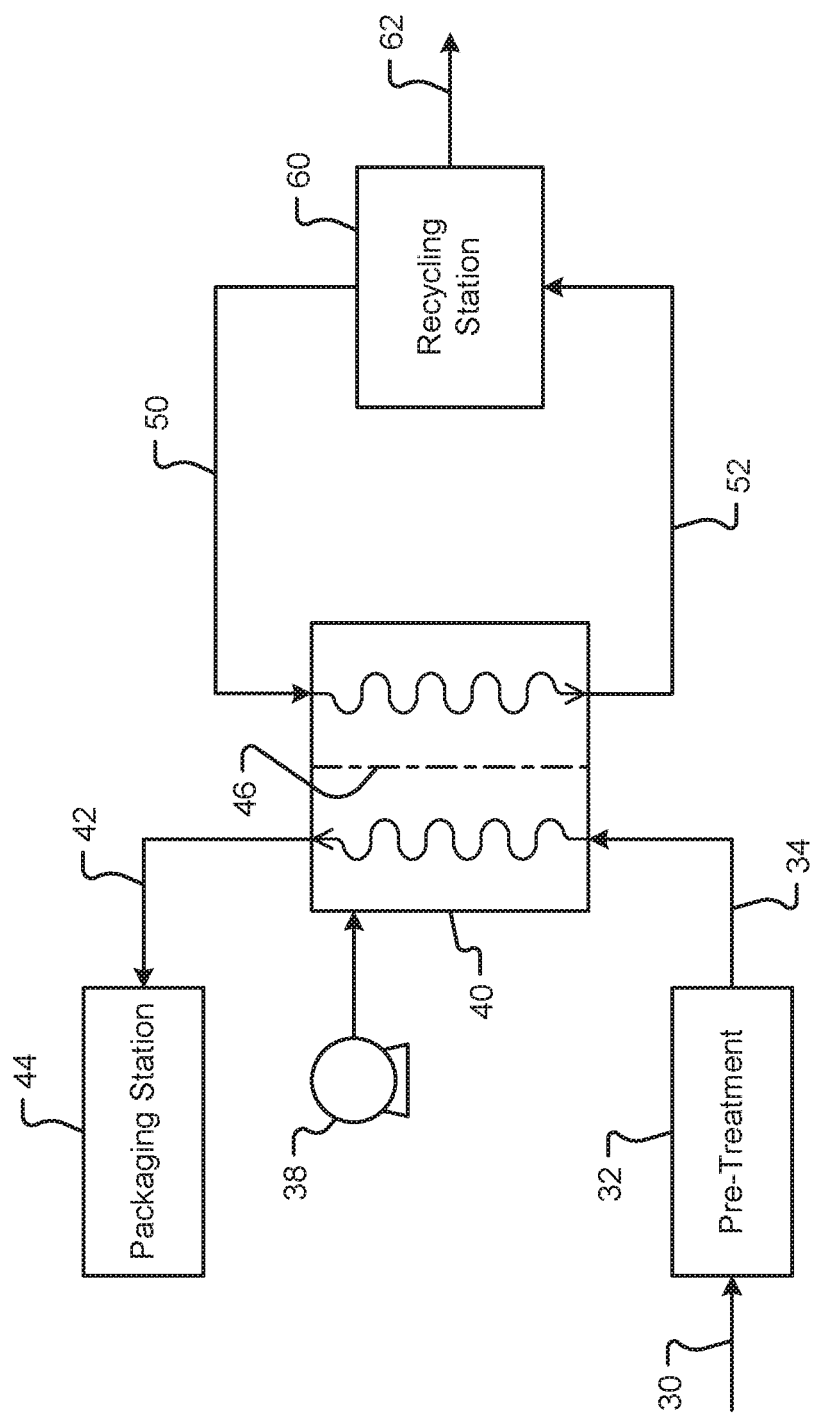
FIG. 2 is a simplified schematic diagram illustrating a system of the invention.

Referring to the simplified schematic diagram of FIG. 2, a system for removing water from a solution such as removing water from a malt beverage is illustrated in accordance with embodiments of the present disclosure. A malt beverage stream 30 is introduced to an optional pretreatment or preconditioning station 32. The treated beverage stream 34 is then introduced downstream to a FO filtration device 40. The FO filtration device 40 has one or more FO membranes 46 disposed therein. The device 40 is configured to handle a desired volumetric flow through the device to accommodate desired production requirements. For example, the device may be configured to have one or more FO membranes 46 that provide a flow path(s) of the beverage to optimize dewatering and desired throughput. The flow path(s) may include a serpentine pattern or any other type of torturous flow path in which surface area of the FO membrane(s) in contact with both the beverage stream and draw solution ensures a desired level of beverage stream dewatering. It is also contemplated that the FO filtration device could include a plurality of FO filtration devices arranged in series or in parallel to address desired throughput production requirements.

The beverage stream and draw solution stream may be pressurized to provide the desired flow rate through the FO device. Accordingly, one or more pumps 38 can be used for pressuring the respective streams. Alternatively, one or both of the streams can be gravity fed through the FO device in which the streams have sufficient pressure heads to flow through the device.

The treated beverage stream exits the FO filtration device downstream as the beer extract 42. The beer extract 42 is then transported to a packaging station 44. The draw solution stream 50 is shown as entering the FO filtration device in a countercurrent relationship as compared to the beverage stream; however, it shall be understood that the beverage stream and the draw solution can flow in the same direction with one another through the device 40. A diluted draw solution stream 52 exits the device 40 downstream and is then introduced to a recycling station 60. The recycling station 60 may include one or more water recovery devices. For example, the recycling station may include one or more reverse osmosis devices configured in a cascading configuration for incremental removal of water from the draw solution. The recycling station may also include one or more distillation or evaporative devices in which water is removed. Combinations of these devices may also be adopted to remove water. Reconstituted draw solution may then be reintroduced to the FO filtration device 40 as shown. The recovered water 62 is removed from the system as waste water.

When the beverage is to be rehydrated for consumption, a metered amount of water is added back to the beer extract, along with desired carbonation. In this regard, the beer extract can be rehydrated and carbonated in a manner very similar to soft drink syrup that is reconstituted within a standard beverage dispense system.

The FO filter element is shown in the schematic diagram of FIG. 2 as being a linear shaped element; however, it shall be understood that the FO filter element may have a number of turns or bends that determines the particular flow path through which the beverage and draw solution flow. As mentioned, more than one FO filter element or membrane can be provided within the housing of the device 40 such that the flow of the beverage and draw solution streams can take multiple flow paths through the device. In this regard, a plurality of membranes may be disposed in a serial arrangement or parallel arrangement through the housing of the FO device.

Figure 3:
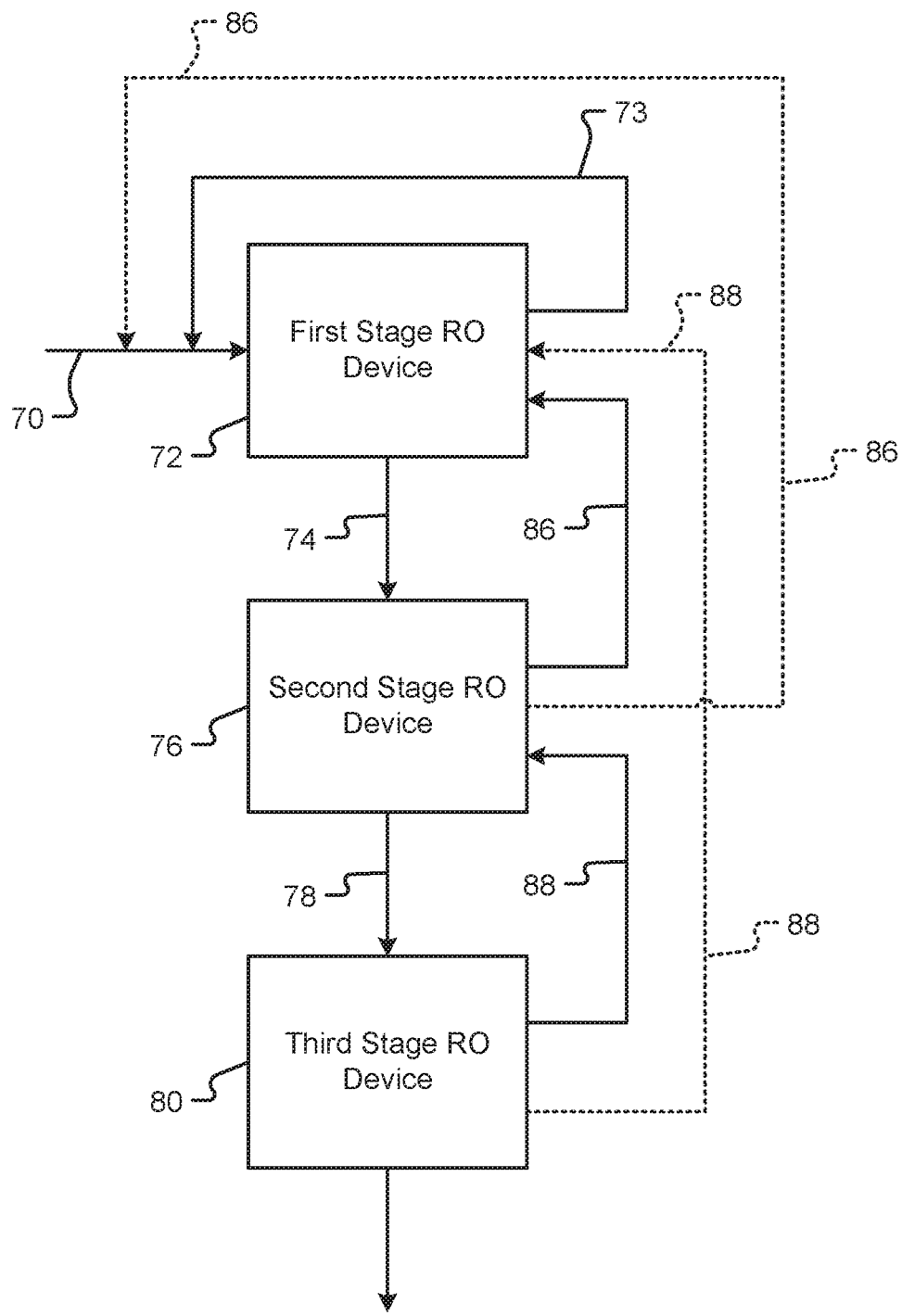
FIG. 3 is a simplified schematic diagram illustrating one method of separating water from the diluted draw solution by a cascading or serial system of RO devices.

Referring to FIG. 3, a schematic diagram of a method and system for recycling or reconstituting the draw solution (i.e., returning the draw solution to its initial concentrations by removal of water, etc.) is shown in accordance with embodiments of the present disclosure. The diluted draw solution 70 enters a first stage RO device 72. Reverse osmosis is conducted within the device 72 to remove a fractional part of the water from the diluted draw solution 70. The retentate stream 74 from the first stage device is then transported to a second stage RO device 76. A second reverse osmosis filtration step is conducted resulting in another retentate stream 78 that has a lower concentration of water as compared to the retentate stream 74. The permeate stream 73 from the first stage RO device 72 can be re-circulated to the original diluted draw solution 70. The permeate stream 86 from the second stage RO device 76 may be re-circulated to the first stage RO device 72, or in the alternative, may be reintroduced into the original draw solution stream 70 as shown in the dashed lines. FIG. 3 illustrates yet another RO device, a third stage RO device 80 that receives the retentate stream 78 from the second stage RO device 76. As with the second stage RO device 76, the permeate stream 88 for the third stage RO device 80 may be conveyed upstream to one or both of the prior RO stages, the solid line showing permeate stream 88 returning to the second stage RO device, and the dashed line 88 showing the permeate stream returning to the first stage RO device 72. The cascading or serial arrangement of RO devices can include more than three such devices in order to remove adequate fractions of water in the progressively strengthened draw solution retentate streams.

Figure 4:
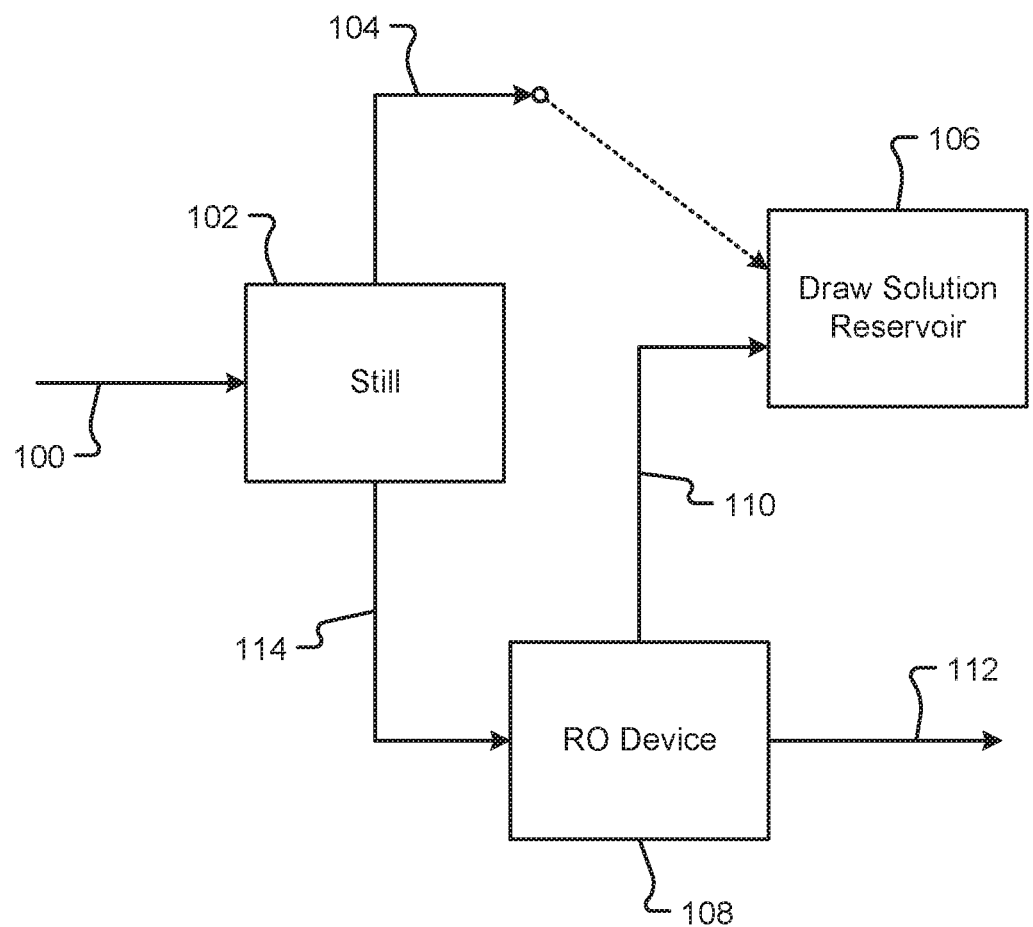
FIG. 4 is another simplified schematic diagram illustrating another method of separating water from the diluted draw solution by distillation followed by a single stage RO filtration.

Referring to FIG. 4, another schematic diagram is provided that illustrates an alternative method and system for reconstituting the diluted draw solution in accordance with embodiments of the present disclosure. The diluted draw solution 100 is conveyed to a distillation device, such as a still 102. Ethanol within the draw solution is boiled off, shown as recovered ethanol 104. The ethanol is condensed and conveyed to the draw solution reservoir 106. The water and glycerol from the diluted draw solution 100 exits the still 102 as secondary draw solution stream 114. This secondary stream 114 is then introduced to a reverse osmosis device 108 in which reverse osmosis separates the glycerol from the water. The recovered glycerol is transported as stream 110 to the draw solution reservoir 106. The separated water leaves the system as wastewater stream 112.

Figure 5:
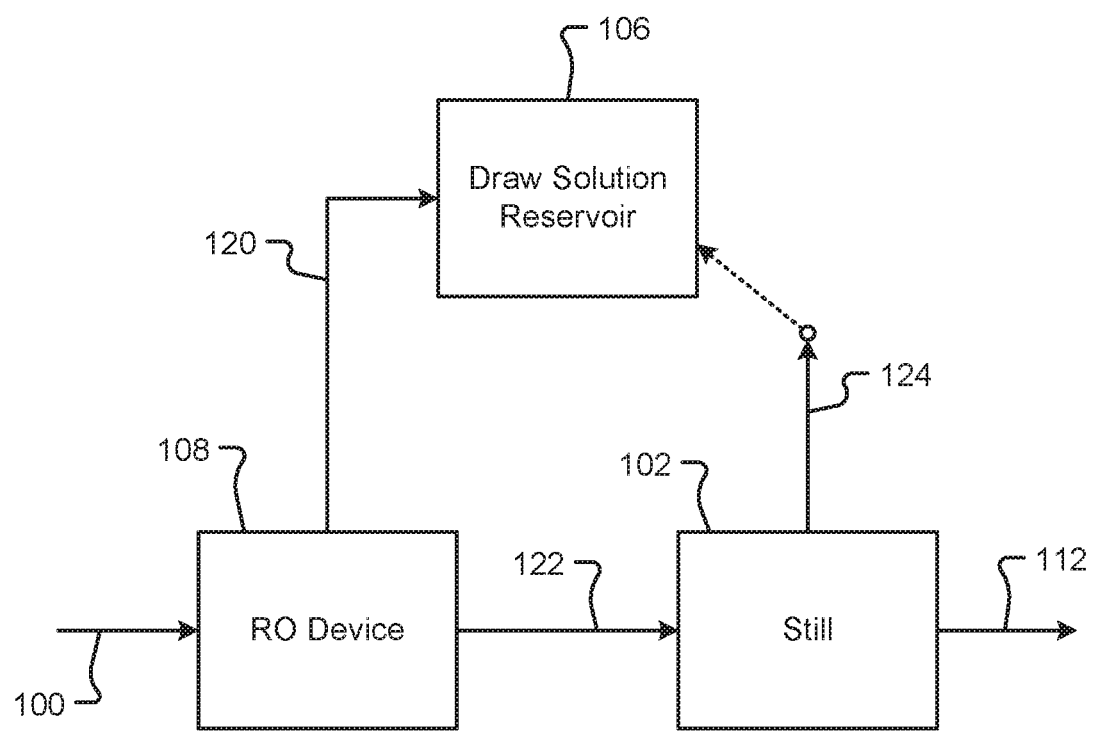
FIG. 5 is another simplified schematic diagram illustrating yet another method of separating water from the diluted draw solution by a first reverse osmosis filtration followed by distillation.

Referring to FIG. 5, a schematic diagram of yet another method and system for reconstituting a diluted draw solution is shown in accordance with embodiments of the present disclosure. In this method/system, the order in which distillation and reverse osmosis take place are reversed as compared to the method/system described in conjunction with FIG. 4. As shown, the diluted draw solution 100 enters the RO device 108. The recovered glycerol is transported as stream 122 to the draw solution reservoir 106. The permeate draw solution from the device 108 is transported as stream 122 to the still 102. The ethanol is boiled off in the still 102 and the recovered ethanol 124 is condensed and conveyed into the draw solution reservoir 106. The remaining water from the still 102 is removed from the system the wastewater stream 112.

As mentioned, the draw solution formula may include a combination of ethanol and glycerol, along with a remaining balance of water. Concentrations for the ethanol and glycerol may vary, but one workable formula for the present invention may include 34% ABV ethanol, 8.5% glycerol, and the remaining balance of water. Generally, the ethanol prevents alcohol in the beer from leaving the beer during the FO filtration. The glycerol provides a raised osmotic pressure to move the water out of the beer. The amount of water to be removed in the passing beverage stream can be controlled in a number of ways, one primary factor being the concentration of the glycerol in the draw solution.

In some embodiments, FO membranes may be manufactured, or used, that allow water to easily pass through the membrane, while volatile and aromatic components of the beer or hard cider may be somewhat restricted enabling the beverage to be dewatered in a single step. Compare this dewatering capability to the prior art in which at least one or two additional steps are required to recover various flavor and aromatic components to the dewatered base liquid.

Regarding the filter membranes making up a filter bank to achieve the FO filtration, the malt beverage or hard cider and the draw solution may take any number of circuitous paths through the filter bank, it being understood that pressure requirements increase as the countercurrent or co-current flows are subjected to increased numbers of turns. According to one embodiment, a geometry of the FO membrane may be similar to that of a plate frame heat exchanger in which the draw solution and malt beverage flow countercurrent to one another within a plurality of manifolds each having a section of membrane disposed therein.

One additional optional step for producing the beer extract is to precisely adjust the final ABV of the beer extract that may be addressed by incremental addition of water. Accordingly, during FO filtration, it is desirable to err on the side of removing too much water as opposed to not enough water so that the ABV can be precisely adjusted by simply adding water.

While various embodiments of the present invention have been described in detail, it is apparent that modifications and alterations of those embodiments will occur to those skilled in the art. It is to be expressly understood that such modifications and alterations are within the scope and spirit of the present invention, as set forth in the following claims. Further, it is to be understood that the invention(s) described herein is not limited in its application to the details of construction and the arrangement of components set forth in the preceding description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

The exemplary systems and methods of this disclosure have been described in relation to alcohol concentration methods and systems. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

Embodiments include a method for producing a beer extract from a conventional brewed beer, the method comprising: introducing a stream of the brewed beer or hard cider into a forward osmosis (FO) device and into contact with one side of a filtration membrane of the device; introducing a stream of a draw solution into the FO device and into contact with an opposite side of the filtration membrane; continuously flowing the stream of brewed beer or hard cider and draw solution to remove water from the brewed beer or hard cider in which forward osmosis allows water to pass through the membrane from the brewed beer into the draw solution; producing the beer extract as water is removed from the stream of brewed beer or hard cider, and passing the beer extract downstream for packaging; producing a diluted draw solution as water passes through the membrane into the draw solution; and conveying the diluted draw solution downstream for recycling.

Aspects of the above method further including maintaining a temperature of the malt beverage or hard cider stream entering the FO device within a range of about −1° C. and 20° C. Aspects of the above method wherein the recycling of the diluted draw solution includes at least one of: (a) conducting reverse osmosis of the diluted draw solution to remove water therein, (b) distillation to remove ethanol within the diluted draw solution and reverse osmosis of the resultant draw solution, and (c) combinations thereof. Aspects of the above method wherein the recycling of the diluted draw solution includes a plurality of stages of reverse osmosis steps wherein the diluted draw solution is processed through a first stage reverse osmosis device to remove a percentage of water therein, and at least a second stage reverse osmosis device to further remove a percentage of water from a treated retentate stream from the first stage RO device. Aspects of the above method further including adjusting a final ABV of the beer extract by incremental addition of water. Aspects of the above method further including pre-treating the malt beverage stream to remove dissolved oxygen. Aspects of the above method include wherein dissolved oxygen is removed such that the beverage stream has less than about 25 ppb dissolved oxygen. Aspects of the above method further including pre-treating the malt beverage stream to remove dissolved carbon dioxide. Aspects of the above method include wherein dissolved carbon dioxide is removed such that the beverage stream has dissolved carbon dioxide at a level below 1.0 gram per liter of beverage. Aspects of the above method include further including conducting physical stabilizing by chill proofing of the malt beverage stream treated by the FO device. Aspects of the above method include wherein chill proofing includes selective addition of any one or selected combinations of tannic acid, SiOH, PVPP treatment, proteolytic enzyme, and/or cold treatment at a temperature of −5° C. to −1° C. for a period of time up to 72 hours. Aspects of the above method include wherein the draw solution includes ethanol, glycerol, and a balance of water. Aspects of the above method include wherein the draw solution includes approximately 34% ABV ethanol, 8.5% glycerol, and a remaining balance of water.

Embodiments include a system for producing a beer extract from a conventional brewed beer or hard cider, the system comprising: a forward osmosis (FO) device for receiving a stream of the brewed beer or hard cider in which the stream of brewed beer or hard cider makes contact with one side of a filtration membrane of the device; a stream of draw solution flowing into the FO device that makes contact with an opposite side of the filtration membrane; at least one pump for pressurizing at least one of the brewed beer or draw solution to cause the brewed beer and draw solution to continuously flow through the device wherein the filtration membrane by forward osmosis causes water to pass through the membrane from the brewed beer into the draw solution; and wherein the beer extract is produced as water is removed from the stream of brewed beer and a diluted draw solution is produced as water passes through the membrane into the draw solution.

Aspects of the above system include wherein the draw solution includes ethanol, glycerol, and a balance of water. Aspects of the above system include wherein the draw solution includes approximately 34% ABV ethanol, 8.5% glycerol, and a remaining balance of water. Aspects of the above system further including a distillation column or reverse osmosis (RO) device for receiving a flow of the diluted draw solution to remove water from the diluted draw solution. Aspects of the above system include wherein the RO device includes a plurality of RO devices arranged to series to progressively remove water from the diluted draw solution. Aspects of the above system further including a still communicating with the RO device to remove selected components of the diluted draw stream. Aspects of the above system include wherein the still is arranged upstream of the RO device to first remove the selected components. Aspects of the above system include wherein the still is arranged downstream of the RO device to remove selected components after reverse osmosis in the RO device.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and/or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for producing a beer extract from a brewed beer or hard cider, the method comprising:
   introducing a stream of the brewed beer or hard cider to a pretreatment station comprising lines through which the stream of the brewed beer or hard cider passes;
   purging the lines of the pretreatment station with nitrogen gas while the stream of the brewed beer or hard cider passes through the lines of the pretreatment station producing a treated beverage stream comprising a nitrogen-purged brewed beer or a nitrogen-purged hard cider that exits the pretreatment station;
   introducing the treated beverage stream into a forward osmosis (FO) device and into contact with one side of a filtration membrane of the FO device;
   introducing a stream of a draw solution into the FO device and into contact with an opposite side of the filtration membrane;
   continuously flowing the treated beverage stream and draw solution to remove water from the treated beverage stream in which FO allows water to pass through the filtration membrane from the treated beverage stream into the draw solution;
   producing the beer extract as water is removed from the treated beverage stream, and causing the beer extract to exit the FO device; and
   transporting the beer extract exiting the FO device to a packaging station for packaging.

2. The method of claim 1, further including maintain a temperature of the treated beverage stream introduced into the FO device within a range of −1° C. and 20° C.

3. The method of claim 1, further including adjusting a final alcohol by volume of the beer extract by an incremental addition of water.

4. The method of claim 1, wherein purging the lines of the pretreatment station with nitrogen gas removes dissolved oxygen from the stream of brewed beer or hard cider passing through the lines of the pretreatment station.

5. The method of claim 4, wherein removing the dissolved oxygen from the stream of brewed beer or hard cider passing through the pretreatment station produces the treated beverage stream having a level of dissolved oxygen that is less than 25 ppb dissolved oxygen.

6. The method of claim 1, wherein purging the lines of the pretreatment station with nitrogen gas reduces an amount of dissolved carbon dioxide from the stream of brewed beer or hard cider passing through the lines of the pretreatment station.

7. The method of claim 6, wherein reducing the amount of dissolved carbon dioxide from the brewed beer or hard cider in the pretreatment station produces the treated beverage stream having a level of dissolved carbon dioxide below 1.0 gram per liter.

8. The method of claim 1, wherein, prior to introducing the treated beverage stream into the FO device, the method further comprises conducing physical stabilizing by chill proofing of the treated beverage stream at a temperate of −5 C to −1° C. for a period of time up to 72 hours.

9. The method of claim 8, wherein chill proofing includes selective addition of at least one of tannic acid, SiOH, and PVPP.

10. A method for producing a beer extract from a brewed beer, the method comprising:
    introducing a stream of the brewed beer to a pretreatment station comprising lines through which the stream of the brewed beer passes, wherein the stream of brewed beer comprises an alcohol by volume of 5% to 20%;
    purging the lines of the pretreatment station with nitrogen gas while the stream of the brewed beer passes through the lines of the pretreatment station producing a treated beverage stream comprising a nitrogen-purged brewed beer that exits the pretreatment station;
    introducing the treated beverage stream into a forward osmosis (FO) device and into contact with one side of a filtration membrane of the FO device;
    introducing a stream of a draw solution into the FO device and into contact with an opposite side of the filtration membrane;
    continuously flowing the treated beverage stream and draw solution to remove water from the treated beverage stream in which FO allows water to pass through the filtration membrane from the treated beverage stream into the draw solution;
    producing the beer extract as water is removed from the treated beverage stream, and causing the beer extract to exit the FO device, wherein the beer extract comprises an alcohol by volume of 24% to 33%.

11. The method of claim 10, further comprising: packaging the beer extract exiting the FO device without further processing of the beer extract.

12. The method of claim 10, wherein purging the lines of the pretreatment station with nitrogen gas removes dissolved oxygen from the stream of brewed beer passing through the lines of the pretreatment station producing the treated beverage stream having a level of dissolved oxygen that is less than 25 ppb dissolved oxygen.

13. The method of claim 12, wherein purging the lines of the pretreatment station with nitrogen gas reduces an amount of dissolved carbon dioxide from the brewed beer passing through the lines of the pretreatment station producing the treated beverage stream having a level of dissolved carbon dioxide below 1.0 gram per liter.

\* \* \* \* \*